United States Patent
Hachisuka et al.

[11] Patent Number: 6,026,968
[45] Date of Patent: Feb. 22, 2000

[54] REVERSE OSMOSIS COMPOSITE MEMBRANE

[75] Inventors: Hisao Hachisuka; Kenichi Ikeda, both of Osaka, Japan

[73] Assignee: Nitto Denko Corporation, Osaka, Japan

[21] Appl. No.: 08/855,336

[22] Filed: May 13, 1997

[30] Foreign Application Priority Data

May 13, 1996 [JP] Japan ................................ 8-118080

[51] Int. Cl.$^7$ .................................................. B01D 29/00
[52] U.S. Cl. ............... 210/490; 210/500.44; 210/500.27; 210/500.21; 210/500.38; 427/245
[58] Field of Search ............................. 210/500.41, 490, 210/638, 500.27, 500.21, 500.38; 427/245

[56] References Cited

U.S. PATENT DOCUMENTS

| | | |
|---|---|---|
| 3,133,132 | 5/1964 | Sidney et al. . |
| 3,133,137 | 5/1964 | Sidney et al. . |
| 3,709,841 | 1/1973 | Quentin . |
| 4,268,650 | 5/1981 | Rose . |
| 4,273,903 | 6/1981 | Rose . |
| 4,277,344 | 7/1981 | Cadotte . |
| 4,520,044 | 5/1985 | Sundet . |
| 4,818,387 | 4/1989 | Ikeda et al. ............................. 210/490 |
| 4,872,984 | 10/1989 | Tomaschke . |
| 4,990,252 | 2/1991 | Tomaschke et al. ............... 210/321.83 |
| 5,009,824 | 4/1991 | Walch et al. ........................ 210/500.28 |
| 5,067,971 | 11/1991 | Bickson et al. ........................... 95/45 |
| 5,304,307 | 4/1994 | Linder et al. ........................... 210/490 |
| 5,364,454 | 11/1994 | Bickson et al. ........................... 95/45 |

FOREIGN PATENT DOCUMENTS

| | | |
|---|---|---|
| 847963 | 7/1970 | Canada . |
| 0142973 | 5/1985 | European Pat. Off. .......... 210/500.41 |
| 60-255109 | 12/1985 | Japan . |
| 60-255110 | 12/1985 | Japan . |
| 1146303 | 7/1986 | Japan ................................ 210/500.41 |
| 1222503 | 10/1986 | Japan ................................ 210/500.41 |
| 2079811 | 4/1987 | Japan ................................ 210/500.41 |
| 62-121603 | 6/1987 | Japan . |
| 63-218208 | 9/1988 | Japan . |
| 1 463 175 | 2/1977 | United Kingdom . |
| 1 473 857 | 5/1977 | United Kingdom . |
| 1 495 887 | 12/1977 | United Kingdom . |

OTHER PUBLICATIONS

A.F. Graefe, D.Wong, "Development of a Chlorine–Resistant Composite Membrane for Reverse Osmosis", (Office of Water Research and Technology, Dept. of the Interior) Report No. 2001–20, Aug. 1980.

*Primary Examiner*—Ana Fortuna
*Attorney, Agent, or Firm*—Akin, Gump, Strauss, Hauer & Feld, L.L.P.

[57] ABSTRACT

A reverse osmosis composite membrane comprising at least a porous support membrane layer and a separation layer, wherein a water-insoluble polymer layer having an anionic hydrophilic group formed on the surface of the separation layer is provided. Therefore, it has high anion property, high salt rejection, high water permeability, and chlorine tolerance, and can perform practical desalination under relatively low pressure.

9 Claims, 2 Drawing Sheets

REVERSE OSMOSIS COMPOSITE MEMBRANE

FIELD OF THE INVENTION

The present invention relates to improvement in the performance of a reverse osmosis composite membrane such as performance stability and fouling tolerance for selectively separating the components of a liquid mixture. More particularly, the present invention relates to a reverse osmosis composite membrane having high salt rejection, high chlorine tolerance, and high fouling tolerance which comprises a hydrophilic polymer thin film having a specific structure on the reverse osmosis composite membrane. Such a reverse osmosis composite membrane is suitable for manufacturing ultrapure water, desalinating brackish water, and the like, and it also can contribute to the removal and recovery of the contaminating sources or effective substances from a soil or the like, the cause of pollution in a dyeing waste water system or an electrochemical deposition paint waste water system to implement a waste water recycling system. In addition, it can operate stably for a long period with respect to the quality of water containing a fouling substance such as an anionic or neutral surfactant which causes a decrease in flux. Furthermore, with the present invention, the chlorine tolerance also can be improved.

DESCRIPTION OF THE PRIOR ART

Examples of the industrially utilized reverse osmosis membranes include Loeb type membranes described in U.S. Pat. Nos. 3,133,132 and 3,133,137 as asymmetric membranes made of cellulose acetate. On the other hand, reverse osmosis composite membranes, in which an active thin film substantially having selective separation property is formed on a microporous support membrane, are known as reverse osmosis membranes having a different structure from the asymmetric reverse osmosis membranes.

Presently, a number of such reverse osmosis composite membranes, in which a thin film of polyamide obtained by interfacial polymerization of polyfunctional aromatic amine and polyfunctional aromatic acid halide is formed on a support membrane, are known (for example, Publication of Japanese Unexamined Patent Application No. 55-147106, Publication of Japanese Unexamined Patent Application No. 62-121603, Publication of Japanese Unexamined Patent Application No. 63-218208, and Publication of Japanese Unexamined Patent Application No. 2-187135).

Also, those having a thin film of polyamide obtained by interfacial polymerization of polyfunctional aromatic amine and polyfunctional alicyclic acid halide formed on a support membrane are proposed (for example, Publication of Japanese Unexamined Patent Application No. 61-42308).

The above reverse osmosis composite membranes have high desalination performance and water permeability. However, in recent water treatment systems, higher membrane performance is required according to their applications. For example, in the field of manufacturing ultrapure water, operation under very low pressure, high salt rejection, and the like are required. Also, in an application such as the desalination of brackish water, because many types of ions are contained in the raw water for brackish water, higher desalination performance is required for each type of mixed ions. In operating such a system for a long period, a fungicide such as sodium hypochlorite is used to prevent a decrease in water quality caused by propagation of bacteria or the like. However, in order to prevent the membrane itself from being degraded by the fungicide, higher fungicide tolerance is required. Furthermore, in order to remove a specific substance such as an anionic substance, a method for enhancing the polarity of the membrane, or the like, is required.

Various methods for sulfonating a polysulfone copolymer are disclosed as methods for adding anion property. For example, Canadian Patent No. 847963 has already proposed a linear polysulfone copolymer itself expressed by the following Formulae (1) and (2).

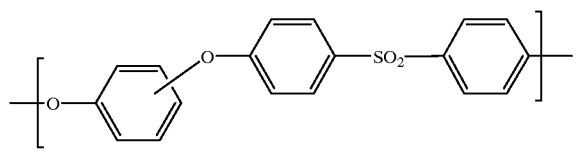

(1)

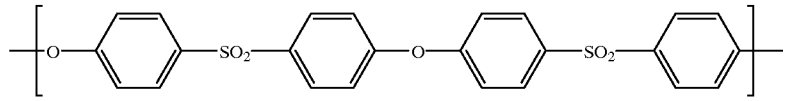

(2)

Publication of Japanese Unexamined Patent Application No. 55-48222 has already proposed a sulfonated a copolymer having the above Formulae (1) and (2). This publication describes dissolving the above polysulfone copolymer in concentrated sulfuric acid to sulfonate it to produce hydrophilic sulfonated polysulfone in which substantially all of the repeating units of the above Formula (1) are sulfonated, while substantially all of the repeating units of the above Formula (2) remain in a non-sulfonated state. Also, it mentions that this sulfonated polysulfone copolymer is potentially useful as an ultrafiltration membrane.

U.S. Pat. No. 3,709,841 describes a sulfonated polysulfone whose repeating unit has the following Formula (3).

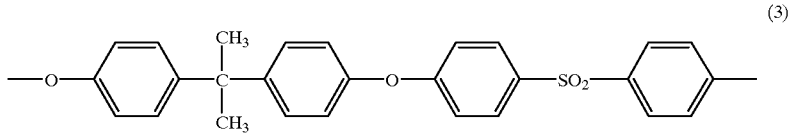
(3)

Publication of Japanese Unexamined Patent Application No. 50-99973 and Publication of Japanese Unexamined Patent Application No. 51-146379 proposes methods for manufacturing a reverse osmosis composite membrane in which a thin film having semipermeability is laminated on an ultrafiltration membrane by coating the surface of the anisotropic ultrafiltration membrane with a solution of such a sulfonated polysulfone and vaporizing the solution. Similarly, DEVELOPMENT OF A CHLORINE-RESISTANT COMPOSITE MEMBRANE FOR REVERSE OSMOSIS Report No. 2001-20 describes a method for manufacturing a reverse osmosis composite membrane by fouling (making unfilterable) an anisotropic ultrafiltration membrane having the repeating units of the above Formula (3) with an aqueous solution of lactic acid beforehand, coating the membrane with a solution of sulfonated polysulfone, and vaporizing the solution.

Publication of Japanese Examined Patent Application No. 5-2364 and Publication of Japanese Examined Patent Application No. 5-2365 describe semipermeable membranes of sulfonated polysulfone to achieve higher performance.

However, the conventional membranes as mentioned above had a low rate of removing sodium chloride and a low flux. Therefore, they did not have sufficient performance for a reverse osmosis membrane.

As mentioned above, the current reverse osmosis composite membranes are insufficient to enhance the anion property of the membrane and satisfy the requirements for the reverse osmosis membrane having a high salt removal rate and a high flux. Therefore, a reverse osmosis composite membrane having higher performance is required. Also, one of the problems of the above polyamide reverse osmosis membranes are that they are not tolerant to chlorine and cannot perform sufficient chlorine sterilization, and therefore they cannot wash efficiently when water permeability decreases. Thus, improvement in chlorine tolerance is required.

SUMMARY OF THE INVENTION

It is an object of the present invention to provide a reverse osmosis composite membrane that has high anion property, high salt rejection, high water permeability, and chlorine tolerance, and can perform practical desalination under relatively low pressure.

In order to achieve the above object, a first reverse osmosis composite membrane of the present invention comprises at least a porous support membrane layer and a separation layer, wherein a polymer having an anionic hydrophilic group exists in at least one layer selected from the group consisting of the porous support membrane layer and the separation layer.

Next, a second reverse osmosis composite membrane of the present invention comprises at least a porous support membrane layer and a separation layer, wherein a water-insoluble polymer layer having an anionic hydrophilic group is formed on a surface of the separation layer. In the above, the thickness of the water-insoluble polymer layer having an anionic hydrophilic group is preferably in the range of 0.001 to 5.0 μm.

According to the first and second reverse osmosis composite membranes, a reverse osmosis composite membrane that has high anion property, high salt rejection, and high water permeability, and can perform practical desalination under relatively low pressure can be implemented.

In the first and second reverse osmosis composite membranes, the fixed charge density of the reverse osmosis composite membrane is preferably $-2.5 \times 10^{-3}$[mol/l] or less, more preferably in the range of $-1.0 \times 10^{-1}$[mol/l] to $-2.5 \times 10^{-3}$[mol/l], most preferably about $-7.0 \times 10^{-3}$[mol/l].

In the first and second reverse osmosis composite membranes, the water-insoluble polymer having an anionic hydrophilic group is preferably a polymer having a sulfonic acid group. The polymer that substantially has an anionic hydrophilic group according to the present invention is a polymer insoluble in water, an aqueous solution containing salts, or an aqueous solution containing a small amount of an organic substance, and is selected from the group consisting of vinyl polymers, condensation polymerized compounds, and addition polymerized compounds which have an anionic hydrophilic group. Typical examples of such anionic hydrophilic groups include the following Formulae (4)–(7).

(4)

(5)

(6)

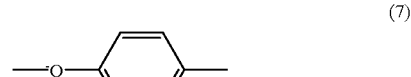

(7)

Any polymer having at least one of these may be used. Preferably, a polymer having a —SO₃— group is used. More preferably, sulfonated polysulfone is used as the polymer having a —SO₃— group.

In the first and second reverse osmosis composite membranes, the polymer having a sulfonic acid group is preferably a polymer in which a polymer having a unit of the following Formula (8) in a part is sulfonated.

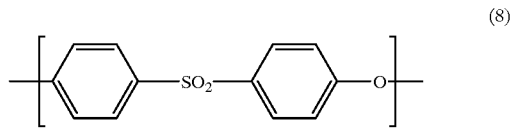
(8)

In the first and second reverse osmosis composite membranes, the polymer having a unit of the above Formula (8) in a part is preferably at least one selected from the group consisting of polysulfone, polyether sulfone, and polyether ether sulfone.

In the first and second reverse osmosis composite membranes, the polymer having a sulfonic acid group is preferably formed by partly sulfonating a polymer having at least one unit selected from Formulae (9)–(10), and is preferably formed of water-insoluble, partly sulfonated polysulfone in which a logarithmic viscosity of a solution in which 0.5 g of the polymer is dissolved in 100 ml of N-methyl-2-pyrrolidone is 0.5 cm$^3$/g or more when measured at 30° C. and an ion-exchange capacity is 2 milliequivalent/g or less.

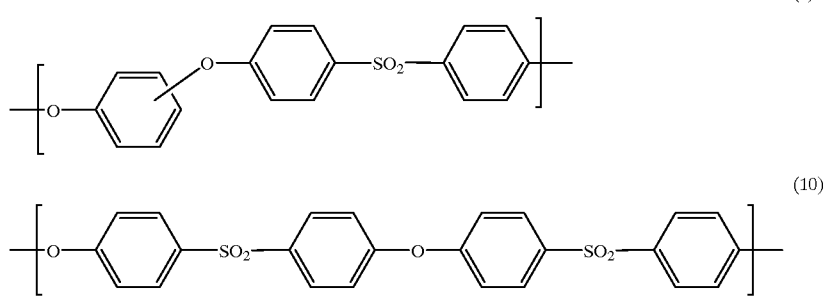

(9)

(10)

In the first and second reverse osmosis composite membranes, a sulfonic acid group of the partly sulfonated polysulfone is preferably expressed by —SO$_3$M (in which M represents hydrogen, alkali metal, or tetraalkylammonium).

As mentioned above, the first reverse osmosis composite membrane of the present invention comprises at least a porous support membrane layer and a separation layer, wherein a polymer having an anionic hydrophilic group exists in at least one layer selected from the group consisting of the porous support membrane layer and the separation layer. Therefore, it has high anion property, high salt rejection, high water permeability, and chlorine tolerance, and can perform practical desalination under relatively low pressure.

Next, the second reverse osmosis composite membrane of the present invention comprises at least a porous support membrane layer and a separation layer, wherein a water-insoluble polymer layer having an anionic hydrophilic group is formed on a surface of the separation layer. Therefore, it has high anion property, high salt rejection, high water permeability, and chlorine tolerance, and can perform practical desalination under relatively low pressure.

DETAILED DESCRIPTION OF THE INVENTION

Figure 1:
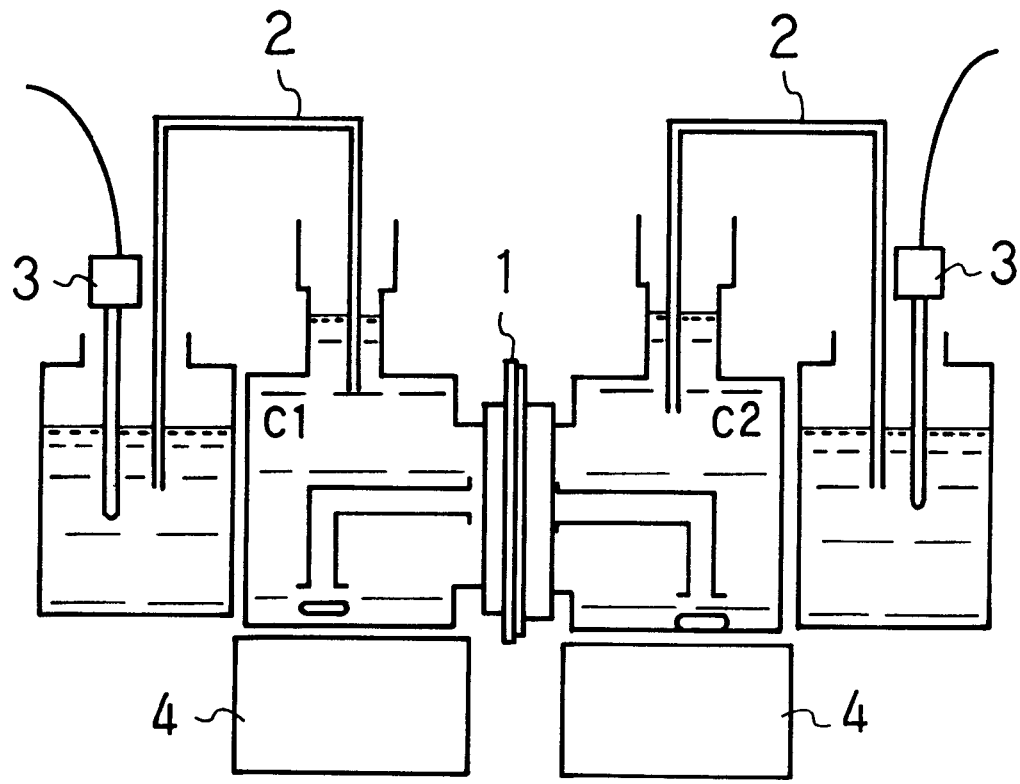
FIG. 1 is a schematic cross-sectional view of an apparatus for measuring a fixed charge density used in Example 1 of the present invention.

A sulfonated polysulfone copolymer used in the present invention may contain a small amount of a dipolar aprotic organic solvent. For example, a thin film of the sulfonated polysulfone copolymer is manufactured by dissolving the copolymer in alkylene glycol monoalkyl ether to make a solution for manufacturing a membrane, coating the surface of the separation layer of a suitable reverse osmosis composite membrane with this solution, and vaporizing the solvent. The sulfonated polysulfone copolymer used in the present invention can be readily obtained by dissolving the above polysulfone copolymer, the above Formulae (9)–(10), or a copolymer of these in concentrated sulfuric acid, and stirring at room temperature for several hours. The degree of sulfonation can be controlled readily by using a copolymer in which the ratio of repeating units of the above Formula (9) to those of the above Formula (10) is changed because, for example, substantially all of the repeating units of the above Formula (9) are sulfonated, while substantially all of the repeating units of the above Formula (10) remain in non-sulfonated state. Also, the sulfonation of the repeating units of the above Formula (10) can be controlled by controlling the conditions for sulfonation.

In the present invention, when forming such a sulfonated polysulfone copolymer thin film on the surface of a separation layer, it is required that the ion-exchange capacity is 2 milliequivalent/g or less per 1 g of a dry resin, and that the logarithmic viscosity of a solution in which 0.5 g of this copolymer is dissolved in 100 ml of N-methyl-2-pyrrolidone is 0.5 cm$^3$/g or more when measured at 30° C., preferably 0.7 cm$^3$/g or more, because, if the ion-exchange capacity is more than 2 milliequivalent/g, the sulfonated polysulfone has water solubility, therefore it is not suitable for a semi-permeable membrane that often treats a liquid containing an aqueous medium, and because, if the logarithmic viscosity is less than 0.7 cm$^3$/g, it is difficult to manufacture a uniform thin film layer without defects such as pinholes on the surface of the separation layer. The sulfonic acid group of the sulfonated polysulfone copolymer used in the present invention is expressed by the formula —SO$_3$M, in which M represents hydrogen, alkali metal, or tetraalkylammonium. For example, if a polysulfone copolymer is sulfonated and then this sulfonated polysulfone copolymer is washed and dried, a sulfonated polysulfone copolymer having a free sulfonic acid group can be obtained. If this sulfonated polysulfone copolymer is treated with an aqueous solution of alkali metal hydroxide or alkali metal alcoholate, methanol, ethanol solution, or the like, the sulfonic acid group can be turned into an alkali metal salt. Examples of the alkali metal hydroxides include sodium hydroxide, potassium hydroxide, and lithium hydroxide. Examples of the alkali metal alcoholates include sodium methylate, potassium methylate, and potassium ethylate. If treated with a solution similar to the above, such as tetraalkylammonium, for example, tetramethylammonium hydroxide, tetraethylammonium hydroxide, tetrapropylammonium hydroxide, or tetrabutylammonium hydroxide, the corresponding tetraalkylammonium salt can be made.

The reverse osmosis composite membrane according to the present invention can be manufactured by various methods. It usually can be manufactured by dissolving the above polymer having an anionic hydrophilic group in an organic solvent to make a solution for manufacturing a membrane, coating a separation layer having suitable reverse osmosis performance with this solution, and vaporizing the solvent. Examples of the organic solvents for preparing the solution for manufacturing a thin film may include dipolar aprotic organic solvents such as dimethyl sulfoxide, N-methyl-2-pyrrolidone, N,N-dimethylformamide, and N,N-dimethylacetamide, alkylene glycol monoalkyl ethers in which an alkylene group has 2 or 3 carbon atoms and an alkyl group has 1 to 4 carbon atoms, such as ethylene glycol monomethyl ether, ethylene glycol monoethyl ether, propylene glycol monomethyl ether, and propylene glycol monoethyl ether, methanol, ethanol, and isopropyl alcohol. Some polymers having an anionic hydrophilic group are not dissolved in the above alkylene glycol monoalkyl ether or only swell. However, such polymers having an anionic hydrophilic group are dissolved well in a mixed solvent in which a small amount of the above dipolar aprotic organic solvent is added to the alkylene glycol monoalkyl ether. Using alkylene glycol monoalkyl ether or the mixed solvent of alkylene glycol monoalkyl ether and a small amount of the above dipolar aprotic organic solvent is advantageous, because the solvent can be removed at room temperature or with slight heating for removing the solvent by vaporization as will be described below, and because a uniform thin film without defects can be obtained on the surface of the organic active layer. The concentration of the sulfonated polysulfone copolymer in the solution for manufacturing a thin film also relates to the thickness of the obtained semipermeable membrane. However, usually, it is preferably in the range of 0.01 to 15 wt. %, more preferably in the range of 0.1 to 10 wt. %. The reverse osmosis membrane having a separation layer coated with the solution for manufacturing a membrane need not be limited to a specific membrane. However, the membrane may be cellulose manufactured by a wet method, or it may be polyamide, polyurea, or the like manufactured by an interfacial polymerization method. These membranes can be readily obtained by conventionally known methods. For example, in the interfacial polymerization method, using a porous polysulfone support membrane, at least one surface of the porous polysulfone support membrane is coated with an aqueous solution of a monomer or a polymer having a reactive amino group such as metaphenylenediamine, piperazine, or polyethyleneimine, and the coated surface is brought into contact with a solution, in which a polyfunctional acid chloride such as trimesic acid chloride or isophthalic acid chloride, a polyfunctional isocyanate such as tolylenediisocyanate, or a mixture thereof is dissolved in a solvent such as hexane, to perform interfacial polymerization on the porous polysulfone support membrane to form a thin film having desalination performance. As a result, a reverse osmosis composite membrane can be made.

In order to provide the surfaces of these separation active layers with a solvent for a polymer solution having an anionic hydrophilic group according to the present invention and vaporize the solvent, heating can be performed as required. The heating temperature may be suitably selected according to the used solvent. Also, in order to facilitate the vaporization of the solvent after coating with the solution for manufacturing a membrane, the solution may be heated in advance. Then, the solvent can be removed from the solution after coating by vaporization to obtain a reverse osmosis composite membrane according to the present invention.

The coating method need not be limited to a specific method. However, a dipping method, a transfer method, a spraying method, or the like is preferably used. It is preferable that the thickness of the obtained polymer thin film having an anionic hydrophilic group is thinner to set the water permeation rate of the membrane higher. The thickness need not be limited to a specific thickness. However, the thickness is usually in the range of 0.001 to 5 $\mu$m. The method for controlling the thickness of the membrane need not be limited to a specific method. However, the thickness can be controlled by the concentration of the solution or the like.

The thus obtained reverse osmosis composite membrane according to the present invention has a high salt removal rate, a high flux, excellent chlorine tolerance, excellent oil resistance, and excellent heat resistance. Therefore, the membrane is preferably used as a reverse osmosis composite membrane. Specifically, it is preferable to form a water-insoluble polymer layer having an anionic hydrophilic group on a separation layer to improve the chlorine tolerance, oil resistance, and heat resistance.

If the polymer having an anionic hydrophilic group is soluble in water, a reverse osmosis composite membrane can be made by dissolving, in advance, the polymer in an aqueous solution of a monomer or a polymer having a reactive amino group such as metaphenylenediamine, piperazine, or polyethyleneimine as mentioned above for the method for manufacturing a reverse osmosis membrane, coating at least one surface of a porous polysulfone support membrane with the solution, and then bringing the coated surface into contact with a solution, in which a polyfunctional acid chloride such as trimesic acid chloride or isophthalic acid chloride, a polyfunctional isocyanate such as tolylenediisocyanate, or a mixture thereof is dissolved in a solvent such as hexane, to perform interfacial polymerization on the porous polysulfone support membrane to form a thin film in a separation layer having desalination performance.

Fixed charge density is used as one of the indices of the anion property of the obtained membrane. The cell shown in FIG. 1 was used for measuring the electric potential of the membrane for the fixed charge density of the membrane. In FIG. 1, 1 denotes a reverse osmosis composite membrane, 2 denotes a salt bridge, 3 denotes a standard calomel electrode, and 4 denotes a stirrer (a stirring apparatus). This apparatus was set in such a manner that the separation layer of the membrane (it is the same with those having a polymer having an anionic hydrophilic group on the surface of the membrane and in the membrane.) was in contact with a concentrated solution, so that the liquid on the surface of the membrane was stirred with the stirrer. Potassium chloride was used for the solution. The concentration ratio was $C_1/C_2=2/1$, and the measurement temperature was 25° C.

The electric potential of the membrane depends on the concentration of the solution, the fixed ion density of the membrane, and the mobility ratio of cation to anion, and the curve fitting of the experimental value and the theoretical value was performed using a TMS model ["Membrane and Ion - The Theory and Calculation of Mass Transfer - " by Tetsuya Hanai, Kagaku Dojin Corporation] to find a fixed charge density. The fixed charge density is preferably $-2.5 \times 10^3$[mol/liter] or less to enhance anion property and improve the fouling tolerance with respect to anionic substances.

Furthermore, it is preferable for practical operation that the flux of the obtained reverse osmosis composite membrane having a water-insoluble polymer having an anionic hydrophilic group in the surface layer and/or in the separation layer is 0.1 [$m^3/m^2$/day] or more, preferably 0.5 [$m^3/m^2$/day] or more, provided that the pressure is 15 kg/$cm^2$, the temperature is 25° C., and the feed liquid is 1500 ppm NaCl.

The present invention will be described below with reference to the examples. However, the present invention is not intended to be limited to these examples. In the examples, the measurement of the salt removal rate and water permeation rate of the obtained reverse osmosis composite membrane was made by performing a permeation experiment at a temperature of 25° C. and under a pressure of 15 kg/$cm^2$ using an aqueous solution of sodium chloride having a concentration of 1500 ppm as the stock solution.

EXAMPLE 1

An aqueous solution containing 3.0 wt. % of m-phenylenediamine, 0.15 wt. % of sodium lauryl sulfate, 3.0 wt. % of triethylamine, 6.0 wt. % of camphor sulfonic acid, and 5 wt. % of isopropyl alcohol was brought into contact with a porous polysulfone support membrane for several seconds, and the excess solution was removed to form the layer of the above solution on the support membrane.

Next, an IP1016 (isoparaffin hydrocarbon oil manufactured by Idemitsu Petrochemical Corporation) solution containing 0.20 wt. % of trimesic acid chloride and 0.05 wt. % of isopropyl alcohol was brought into contact with the surface of such a support membrane, and was then maintained in a hot air dryer at 120° C. for three minutes to form a polymer thin film on the support membrane to obtain a reverse osmosis membrane.

Figure 2:
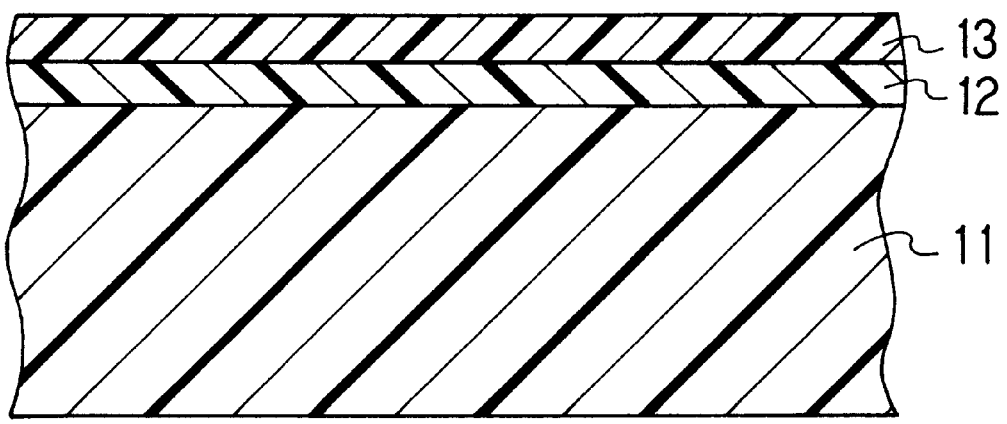
FIG. 2 is a schematic cross-sectional view of a reverse osmosis composite membrane obtained in Example 1 of the present invention.

A sulfonated polysulfone copolymer (the above Formulae (9): (10) =57:43 (mole ratio)) having a logarithmic viscosity of 0.84 $cm^3$/g and an ion-exchange capacity of 1.23 milliequivalent/g was dissolved in ethylene glycol monomethyl ether to obtain a 0.25 wt. % solution. The above reverse osmosis membrane was coated with this solution by a dipping method and was dried at 60° C. for three minutes to form a thin layer (average thickness: 0.2 μm). The schematic cross-sectional view of the obtained membrane is shown in FIG. 2. In FIG. 2, 11 denotes a porous polysulfone support membrane, 12 denotes a separation layer, and 13 denotes an anionic sulfonated polysulfone copolymer layer.

After the membrane obtained in the above manner was dipped in an anionic surfactant (500 ppm) solution for 46 hours, it was measured again under the above conditions. The measured results are shown in Table 1.

Also, after the membrane was washed with an aqueous solution of sodium hypochlorite (20 ppm, pH=7.0) for 30 min and with ultrapure water for 30 min, the fixed charge density of the membrane was measured according to the method described above for FIG. 1. The results are shown in Table 3. Also, the same membrane was set in a cell for measurement, an aqueous solution of sodium hypochlorite having 100 ppm was circulated on the surface of the membrane for 48 hrs, and then the membrane was measured with the same aqueous solution of sodium chloride having 1500 ppm as shown in Table 1. The results are shown in Table 2.

COMPARATIVE EXAMPLE 1

After a microporous polysulfone support membrane was coated with an aqueous solution containing 2.0 wt. % of m-phenylenediamine, 0.3 wt. % of sodium dodecyl sulfate, 4.0 wt. % of camphor sulfonic acid, and 2.0 wt. % of triethyleneamine, it was brought into contact with a n-hexane 0.5 wt. % solution comprising a mixed solution of trimesic acid chloride/isophthalic acid chloride (=⅔:weight ratio), and was then dried by hot air at 120° C. for five minutes to obtain a reverse osmosis composite membrane. The obtained reverse osmosis composite membrane was evaluated in the same manner as Example 1. The results are shown in Tables 1 and 2. Also, the fixed charge density is shown in Table 3.

TABLE 1

| | Initial performance | | After immersing in anionic surfactant (500 ppm) solution for 46 hrs | | |
|---|---|---|---|---|---|
| Sample No. | * Rej. (%) | ** $m^3/m^2$/d | * Rej. (%) | ** $m^3/m^2$/d | *** Flux/Flux2 |
| Example 1 | 99.11 | 0.58 | 98.53 | 0.56 | 97% |
| Comparative Example 1 | 99.47 | 0.70 | 98.80 | 0.47 | 67% |

*NaCl, 1500 ppm
**Flux
***Maintenance rate

TABLE 2

| | Initial performance | | After circulating 100 ppm aqueous solution of sodium hypochlorite (48 hrs) | | |
|---|---|---|---|---|---|
| Sample No. | * Rej. (%) | ** $m^3/m^2$/d | * Rej. (%) | ** $m^3/m^2$/d | *** Flux/Flux2 |
| Example 1 | 99.11 | 0.58 | 98.90 | 0.60 | — |
| Comparative Example 1 | 99.47 | 0.70 | 88.12 | 2.12 | — |

*NaCl, 1500 ppm
**Flux
***Maintenance rate

TABLE 3

| Sample No. | Fixed charge density A × $10^3$[mol/l] |
|---|---|
| Example 1 | −7.0 |
| Comparative Example 2 | −2.3 |

As is apparent from the results in Tables 1–3, it could be confirmed that the reverse osmosis composite membrane in this example had high anion property, high salt rejection, high water permeability, and also chloride tolerance, and was capable of performing practical desalination under relatively low pressure. On the other hand, in the reverse osmosis composite membrane in Comparative Example 1, the initial flux was relatively high, while the flux after dipping in the anionic surfactant solution greatly decreased (Table 1). Also, in Comparative Example 1, due to the damage to the membrane caused by chlorine, the rejection decreased, and therefore the flux increased. In Example 1, because there is no damage to the membrane caused by chlorine, the rejection decreased little, and the flux of the initial performance was maintained (Table 2).

What is claimed is:

1. A reverse osmosis composite membrane comprising at least a porous support membrane layer and a polyamide separation layer, wherein a polymer having an anionic hydrophilic group is present as a separate layer on at least one layer selected from the group consisting of the porous support membrane layer and the polyamide separation layer, wherein the polymer having an anionic hydrophilic group is a water-insoluble polymer having a sulfonic acid group that is sulfonated and includes a unit of the following Formula (1),

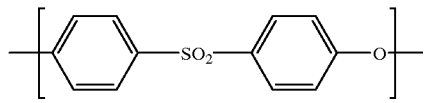

(1)

and further wherein the polymer is selected from the group consisting of a polysulfone, polyether sulfone, and polyether ether sulfone.

2. The reverse osmosis composite membrane according to claim 1, wherein a fixed charge density of the reverse osmosis composite membrane is $-2.5\times10^{-3}$ [mol/l] or less.

3. A reverse osmosis composite membrane comprising at least a porous support membrane layer and a polyamide separation layer, wherein a water-insoluble polymer layer having an anionic hydrophilic group is formed on a surface of the separation layer.

4. The reverse osmosis composite membrane according to claim 3, wherein a fixed charge density of the reverse osmosis composite membrane is $-2.5\times10^{-3}$ [mol/l] or less.

5. The reverse osmosis composite membrane according to claim 3, wherein the water-insoluble polymer having an anionic hydrophilic group is a polymer having a sulfonic acid group.

6. The reverse osmosis composite membrane according to claim 5, wherein the polymer having a sulfonic acid group is a polymer in which a polymer having a unit of the following Formula (4) is partly sulfonated

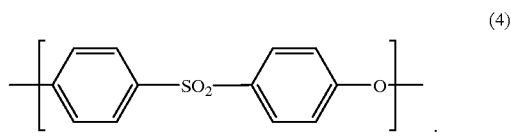

(4)

7. The reverse osmosis composite membrane according to claim 6, wherein the polymer having a unit of the Formula (4) is at least one selected from the group consisting of polysulfone, polyether sulfone, and polyether ether sulfone.

8. The reverse osmosis composite membrane according to claim 5, wherein the polymer having a sulfonic acid group is formed by partly sulfonating a polymer having at least one unit selected from the following Formulae (5)–(6) and is formed of water-insoluble, partly sulfonated polysulfone in which a logarithmic viscosity of a solution in which 0.5 g of the polymer is dissolved in 100 ml of N-methyl-2-pyrrolidone is 0.5 cm³/g or more when measure at 30° C. and an ion-exchange capacity is 2 milliequivalent/g or less.

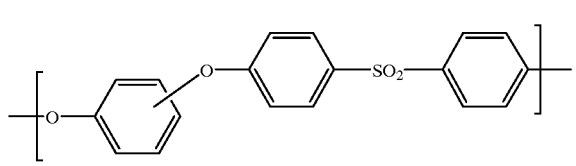

(5)

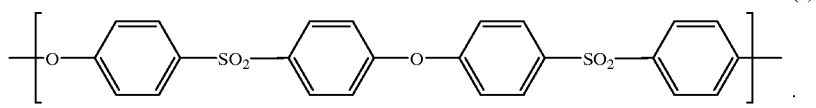

(6)

9. The reverse osmosis composite membrane according to claim 8, wherein a sulfonic acid group of the partly sulfonated polysulfone is expressed by —SO₃M (in which M represents hydrogen, alkali metal, or tetraalkylammonium).

* * * * *